(12) United States Patent
Hammond et al.

(10) Patent No.: US 7,779,887 B2
(45) Date of Patent: Aug. 24, 2010

(54) ROTATING END CAP

(75) Inventors: Christopher R. Hammond, Rochester Hills, MI (US); Bryan Busha, Grand Blanc, MI (US); Joseph P. Wieczorek, Lake Orion, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 577 days.

(21) Appl. No.: 11/651,718

(22) Filed: Jan. 10, 2007

(65) Prior Publication Data
US 2008/0163990 A1 Jul. 10, 2008

(51) Int. Cl.
*E06B 9/17* (2006.01)
(52) U.S. Cl. .................. 160/323.1; 160/263; 160/903; 248/270; 403/160
(58) Field of Classification Search .............. 160/323.1, 160/903, 290.1, 265, 263, 902, 370.22, 405; 248/911, 912, 269, 270, 271, 272; 296/37.16, 296/97.7, 97.8, 97.9; 403/160; 16/224, 355
See application file for complete search history.

(56) References Cited

U.S. PATENT DOCUMENTS

| | | | | |
|---|---|---|---|---|
| 2,742,936 A | * | 4/1956 | Cooley | 30/519 |
| 4,059,938 A | | 11/1977 | Aimar | |
| 4,729,418 A | * | 3/1988 | Rude | 160/323.1 |
| 4,781,234 A | | 11/1988 | Okumura et al. | |
| 4,968,171 A | * | 11/1990 | Shell | 403/4 |
| 5,462,329 A | * | 10/1995 | Cheng | 296/98 |
| 5,495,884 A | * | 3/1996 | Shikler | 160/120 |
| 5,618,077 A | | 4/1997 | Ament et al. | |
| 5,676,415 A | | 10/1997 | Ament et al. | |
| 5,685,592 A | * | 11/1997 | Heinz | 296/37.16 |
| 5,813,449 A | | 9/1998 | Patmore et al. | |
| 5,934,354 A | | 8/1999 | Price et al. | |
| 5,947,358 A | | 9/1999 | Wieczorek | |
| 5,961,172 A | | 10/1999 | Ament et al. | |
| 6,039,105 A | | 3/2000 | Patmore et al. | |
| 6,125,908 A | * | 10/2000 | Ament et al. | 160/323.1 |
| 6,135,192 A | * | 10/2000 | Suzuki et al. | 160/370.22 |
| 6,183,028 B1 | | 2/2001 | Ament et al. | |
| 6,213,186 B1 | | 4/2001 | Torres et al. | |
| 6,279,639 B1 | | 8/2001 | Schlecht et al. | |
| 6,483,027 B1 | | 11/2002 | Howard et al. | |
| 6,488,325 B1 | | 12/2002 | Ehrenberger et al. | |
| 6,592,165 B2 | | 7/2003 | Ament et al. | |
| 6,709,039 B1 | | 3/2004 | Davenport | |
| 6,715,525 B2 | | 4/2004 | Ehrenberger et al. | |
| 6,913,303 B2 | | 7/2005 | Kobiela et al. | |
| 6,918,623 B2 | | 7/2005 | Hansen et al. | |
| 6,921,119 B2 | | 7/2005 | Haspel et al. | |
| 6,966,591 B2 | | 11/2005 | Schlecht | |
| 7,014,239 B2 | | 3/2006 | Ehrenberger | |
| 7,017,965 B2 | | 3/2006 | Sitzler et al. | |

(Continued)

*Primary Examiner*—David Purol
(74) *Attorney, Agent, or Firm*—Raggio & Dinnin, P.C.

(57) ABSTRACT

An end cap for use in a shade assembly for use in a vehicle wherein the end cap is a rotating end cap. The end cap is capable of rotating and twisting and includes a base and a rotating connector partially arranged within an end of the base. The rotating end cap also includes an extension with the rotating connector partially arranged within an end of the extension. The rotating end cap will allow for the end cap to effectively reduce its length by rotating the extension with relation to the base from a generally parallel position to one having an orthogonal position between the extension and base.

23 Claims, 3 Drawing Sheets

U.S. PATENT DOCUMENTS 7,021,692 B2  4/2006  Laudenbach et al.
7,028,872 B2  4/2006  Lobanoff 7,143,805 B1 *  12/2006  Weir ..................... 160/370.22

* cited by examiner

ROTATING END CAP

BACKGROUND OF THE INVENTION

1. Field of the Invention

The subject invention generally relates to vehicle roller shade assemblies, and more particularly relates to a vehicle roller shade assembly having a folding end cap.

2. Description of Related Art

Security shades and window coverings are well known in the prior art of vehicles. In particular, security shades have been used in the prior art for covering rear compartments of SUV's or hatchback vehicles, shades for covering automobile windows, or rollers for barrier nets and the like. These shades have all been well known and used in the art for numerous years. Generally, these shade assemblies are valuable accessories to most consumers, however, it is often desirable to remove the roller from the vehicle, thus making ease of installation or removal from the vehicle a key feature of the device. Another key feature of the device is the ability to use the security shade in a variety of positions within the automobile vehicle, thus requiring a change in the length of the roller or end caps for the security shade to allow for such variety of uses within an automotive vehicle interior.

Many of these prior art shade assemblies that are used as security shades are built in numerous variations and with multiple lengths for a single model vehicle or across a larger vehicle line. For example, many of the security shades are typically mounted in the brackets between the interior trim panels inside of a motor vehicle. If the distance between the two interior panels varies between cars of the same production by either numerous inches, tenths of inches, or the like, the shade assembly must still be able to fit between the panels and not rattle back and forth within the vehicle. Therefore, the ability to have a two position end cap that will change the overall length of a roller of a security shade will allow for a single vehicle security shade to be used across numerous vehicle lines, not just a specifically designed and built single model security shade as has been the case in most prior art shade assembly systems.

Many of these prior art vehicle security shades have a roller that utilizes end caps at the end of the rollers and generally either one or both of them are spring loaded on their respective ends of the rollers. To install the rollers, the end caps are compressed to fit the roller into the brackets, and when released the spring or springs in the end caps exert an axially outward force against the brackets on the trim panels, keeping the roller in place within the vehicle interior. Many of these spring loaded designs also provide a self centering action which allows for easy installation or removal of such vehicle security shades even with one hand.

There have been many attempts within the prior art to secure the roller within the brackets, which have been met with relative amounts of success. Generally, many of these devices typically add weight and/or cost to the shade and/or limit the advantages of the floating end caps thus making the shade significantly more difficult to install or remove. Therefore, there is a need in the prior art for a novel and improved end cap for use with a security shade or shade assembly within a vehicle. There also is a need in the prior art for a folding end cap that will in effect reduce the length of the shade assembly to allow for a single shade assembly to be used over a variety of vehicle lines having a variety of lengths within the interior of the vehicles. Furthermore, there is a need in the art for an end cap that will allow for a pivoting action to create a two position end cap that can be used on one or both ends of a roller system to effectively allow for three variations of length if an end cap is used on both ends according to the present invention. This will greatly reduce the cost to manufacture and design a vehicle security shade for use across multiple vehicle lines of an automotive manufacturer. There also is a need in the art for an easier design and more efficient methodology of creating an end cap that can have varying lengths for use in various positions within a single vehicle or for use in multiple model lines across entire vehicle lines of an automotive manufacture.

SUMMARY OF THE INVENTION

One object of the present invention may be to provide an improved end cap for use in a vehicle.

Another object of the present invention may be to provide a rotating end cap for use in an automotive vehicle.

Still another object of the present invention may be to provide a rotating end cap that is capable of operating within a motor vehicle interior at predetermined lengths.

Still another object of the present invention may be to provide an end cap for a vehicle shade assembly that includes a base and an extension.

Yet another object of the present invention may be to provide a rotating or twisting end cap that is capable of rotating between a first or standard and a second or rotated position.

Yet another object of the present invention may be to provide an end cap that includes a rotating connector arranged between a base and an extension of the end cap.

Still another object of the present invention may be to provide an end cap that is easier to manufacture and reduces the costs to the automotive manufacturer.

Still another object of the present invention may be to provide an end cap for use on a security shade that is capable of being used across multiple vehicle lines and models for an automotive manufacturer.

Still another object of the present invention may be to provide a vehicle security shade that includes a twisting or rotating end cap arranged on one or both ends thereof.

To achieve the foregoing objects, a shade assembly for use in a vehicle is disclosed. The shade assembly includes a roller, and a shade panel having one end attached to the roller. The assembly also includes an end cap mounted to at least one end of the roller and adapted to engage a portion of the vehicle to support the assembly therein. The end cap having a base, a rotating connector engaging the base and an extension engaging the rotating connector on an end opposite of the end engaged with the base.

One advantage of the present invention may be that it provides a novel and improved end cap for use with a vehicle shade assembly in a vehicle.

A further advantage of the present invention may be that it allows for an adjustable effective length of a security shade via the use of a rotating end cap on one or both ends of the security shade.

Still another advantage of the present invention may be that it provides for the use of a novel end cap that is capable of being used along with a security shade over numerous vehicle lines of an automotive manufacturer because of the effective numerous lengths that can be used with the end caps according to the present invention.

Yet a further advantage of the present invention may be that it creates an easier to manufacture end cap and an end cap that reduce costs to the automotive manufacturer.

Still another advantage of the present invention is that it may provide a rotating end cap that effectively reduces the length of an end cap by the entire length of an extension thereof.

Still another advantage of the present invention is that it may provide for an end cap that rotates or twists from a linear position to an orthogonal position thus creating a reduced length position for the end cap.

Still another advantage of the present invention may be that it provides a rotating or twisting end cap that includes a base and an extension wherein the base and extension are secured to one another via a rotating connector.

Still another advantage of the present invention may be that it provides for a rotating or twisting end cap that includes a base and an extension each having an angled face of approximately 45° on one end thereof.

Other objects, features and advantages of the present invention will become apparent from the subsequent description and the appended claims, taken in conjunction with the accompanying drawings.

DESCRIPTION OF THE EMBODIMENT(S)

Figure 1:
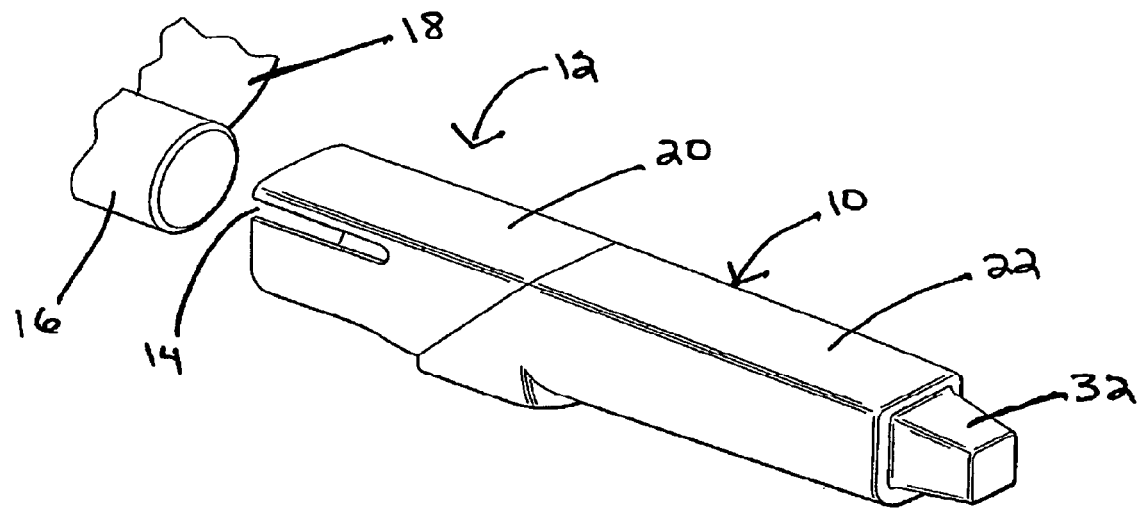
FIG. 1 shows an end cap according to the present invention for use with a vehicle shade assembly.

Referring to the drawings, an end cap 10 for use in a security shade assembly 12 within a vehicle is disclosed. It should be noted that the end cap 10 shown is a rotating end cap, that is capable of being rotated or twisted to reduce its effective length and hence, the length of the vehicle shade assembly 12 for use in an automotive vehicle. It should be noted that the end cap 10 can be used on one or both ends of a vehicle shade assembly 12 thus allowing for up to three different effective lengths for a vehicle shade assembly 12 according to the present invention. The use of the rotating end cap 10 according to the present invention will allow for an automotive manufacturer to use one shade assembly 12 over numerous vehicle lines and vehicle models within the vehicle lines of such automotive manufacturers. This will in effect reduce the cost of designing and manufacturing the end caps 10 for shade assemblies within the interior of automotive vehicles. It should further be noted that the end cap 10 can be used on any type of shade assembly 12 within an automotive vehicle including but not limited to security shades, shades for covering automobile windows, rollers for barrier nets, and any other type of shade or barrier that is used within an automotive or any other type of vehicle. The end cap 10 according to the present invention will allow for ease of use for the person installing such into an automotive vehicle or for the consumer who purchases such device in an after market capacity.

Figure 2:
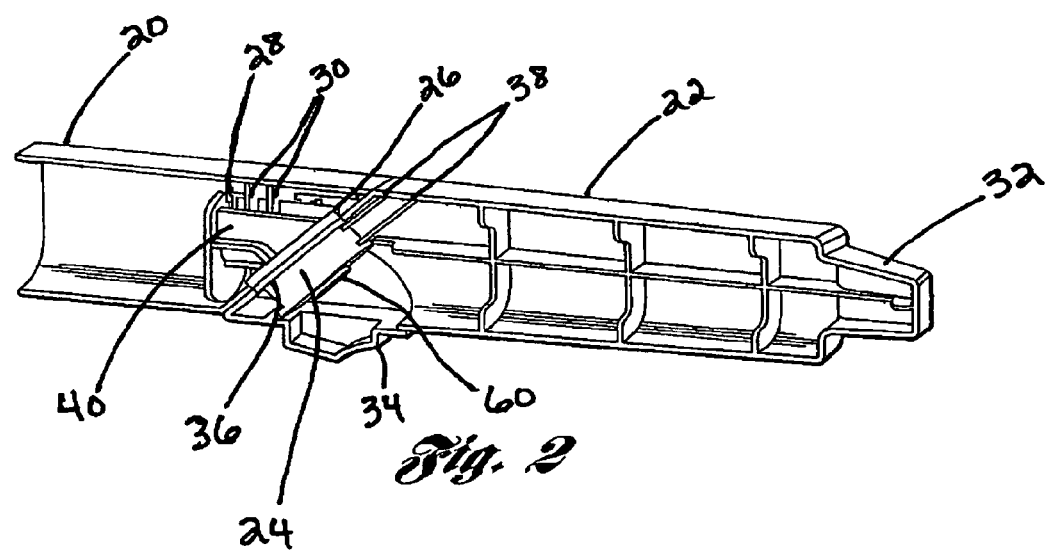
FIG. 2 shows a cutaway view of an end cap according to the present invention.
Figure 3:
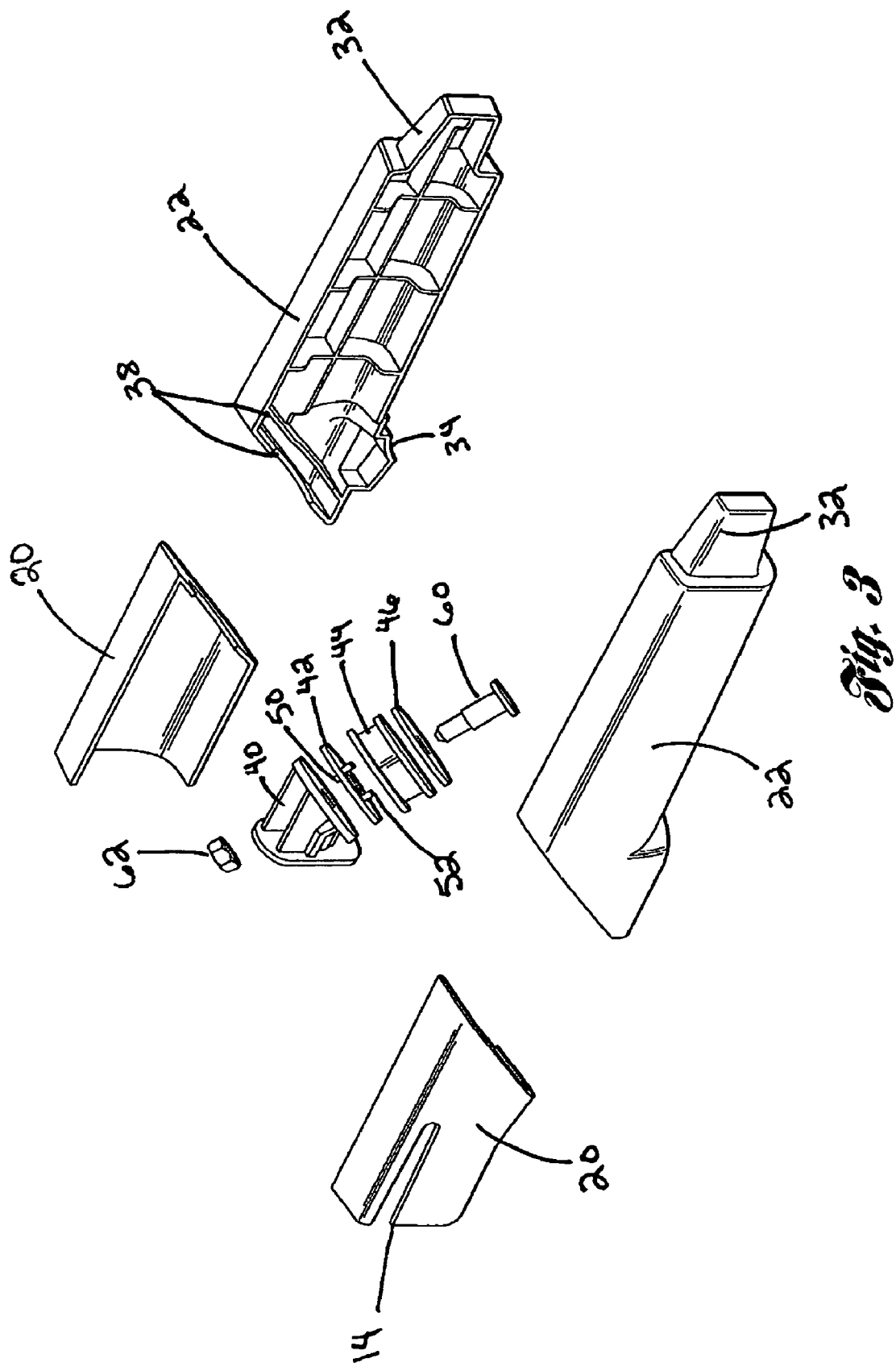
FIG. 3 shows an exploded view of an end cap according to the present invention.
Figure 4:
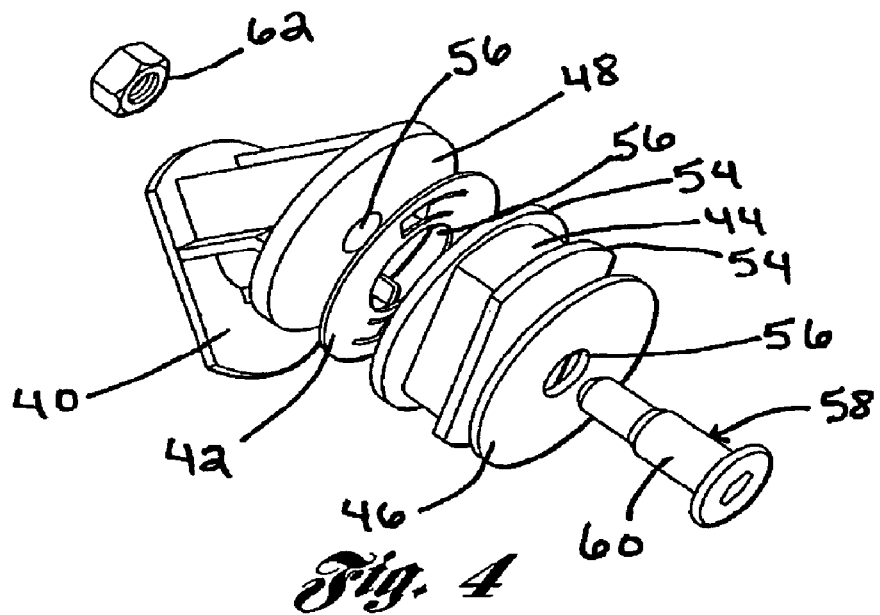
FIG. 4 shows an exploded view of a rotating connector according to the present invention.
Figure 5:
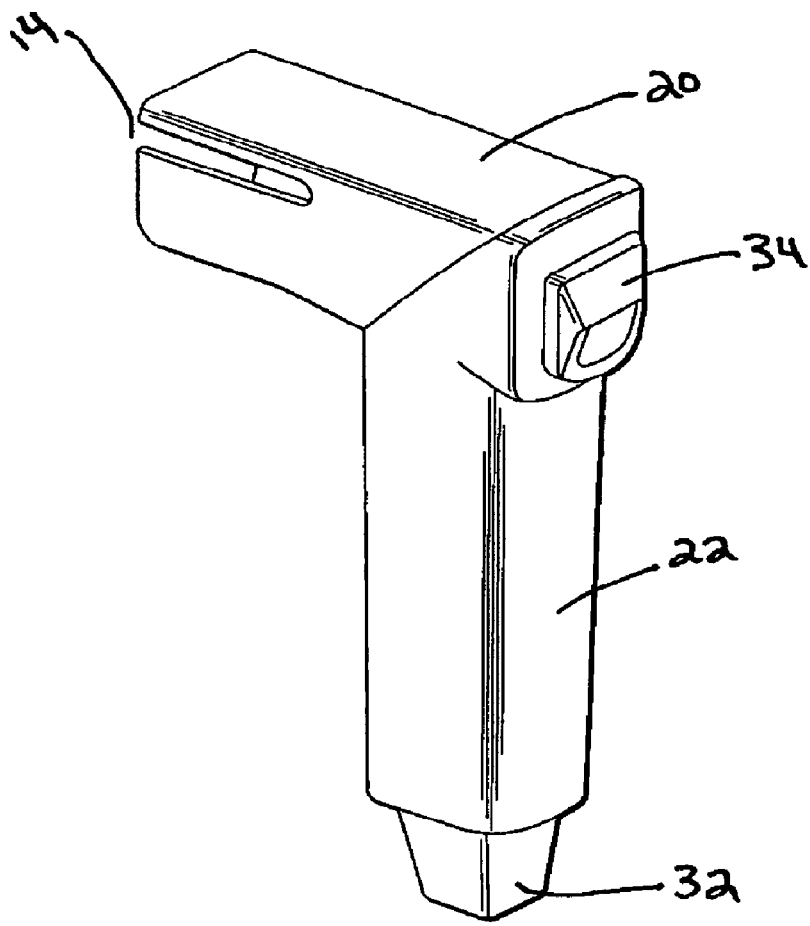
FIG. 5 shows an end cap according to the present invention in its standard or first position and rotated or second position.

FIGS. 1 through 5 show a rotating end cap 10 according to an embodiment of the present invention. The end cap 10 has a slot 14 arranged in one surface thereof. The slot 14 is arranged adjacent to an open end of the end cap 10. Generally, the end cap 10 is made of a hollow plastic body formed by injection molding or some other suitable or well known process. Although it should be appreciated that the end cap 10 may be formed or stamped metal, ceramic, any other type of plastic, composite or natural material depending on the design requirements of the end cap 10. In the embodiment shown, the end cap 10 is mounted at one or both ends of a shade assembly 12 for use in a vehicle interior. The vehicle shade assembly 12 includes a roller 16 and a shade panel 18 attached at one end thereof to the roller 16. The roller 16 is arranged within the end cap 10 such that the end cap 10 will preferably position and secure the roller 16 and shade panel 18 within the vehicle interior for deployment of the flexible shade panel 18 over a predetermined portion of the vehicle such as a cargo area or the like. The slot 14 in the end cap 10 will receive and allow for a portion or edge of the flexible shade panel 18 to wind and unwind around the roller 16 thus allowing the shade panel 18 to pass therethrough while the end cap 10 secures the shade assembly 12 within the motor vehicle without disturbing the shade panel 18 in its extended or stored positions. In one embodiment the end cap 10 is fixed to the shade assembly 12 and in another contemplated embodiment a cassette (not shown) may be arranged over the roller 16 and shade panel 18 and engages the end cap 10 at a predetermined portion thereof or by having the end cap 10 arranged over the cassette thus providing further protection to the shade panel 18 within the shade assembly 12 of the automotive vehicle.

FIGS. 1 through 5 show the rotating or twisting end cap 10 according to the present invention. The rotating or twisting end cap 10 may include a base 20 having a rotating connector 24 secured therein and an extension 22 secured to an opposite end of the rotating connector 24. In the embodiment shown the base 20 has a slot 14 therein that will be used to allow a shade panel 18 to wind or unwind from a roller 16 which is arranged within the base 20 of the end cap 10. The base 20 generally is a hollow plastic body formed by injection molding or some other suitable process. It should be noted that the base 20 may be formed or stamped with a metal, plastic, ceramic, composite or natural material depending on the design requirements for the end cap 10. The twisting end cap base 20 also includes an angled end surface on an opposite end from the open surface therein. The angled surface generally will have a 45° angle however, it should be noted that any other angle can be used for the end of the base 20. The angled surface will have an orifice 26 therethrough. In the embodiment shown the orifice 26 is generally that of a circle. However, any other shaped orifice may be used through the angled end surface of the base 20. The base 20 may also include a circumferential shoulder 28 at a predetermined position therein. The shoulder 28 may be arranged within an interior of the base 20 and will be used to engage with the rotating connector 24 thus securing the rotating connector 24 at a predetermined position within the base 20. It should also be noted that the base 20 as shown in the embodiment is formed of two separate pieces that are connected via any known fastening technique, such as but not limited to welding, gluing, epoxy, fasteners, snaps, pins and dowels or any other known fastening technique. It should be noted that the base 20 may be formed as one piece in another embodiment. In the embodiment shown the base 20 also includes a plurality of other inner extending surfaces 30 that will be used to interact with the rotating connector 24 to help secure the rotating connector 24 with respect to the base 20.

The twisting end cap 10 also includes an extension 22 which generally is formed in two half pieces that are then fastened by any known technique to form the extension 22. In one embodiment the extension will be welded, however any other known fastening technique can be used such as but not limited to gluing, epoxy, snaps, any known fasteners, pins, dowels, poles, or any other known fastening technique may be used to fasten the first and second portion of the extension 22 to form the extension 22. It is also contemplated to form the extension 22 as a single piece as described above for the base 20. The extension 22 may include a boss or knob 32 extending from an end surface thereof. This boss or knob 32 will be used to interact and mate with an interior portion of the vehicle when the end cap 10 is in a first or standard position. The extension 22 may also include a second boss 34 extending from a surface thereof and in an orthogonal direction with relation to the first boss 32. The second boss 34 will be used to interact with an interior portion of the automotive vehicle interior when the twisting end cap 10 is in its second or rotated position. This will allow for the end cap 10 to effectively reduce its length thus reducing the overall length of the shade assembly 12 and allowing for the shade assembly 12 to be used in two different portions of an automotive vehicle or over an entire vehicle line. It should be noted that the extension 22 generally is made of a plastic material, however any other metal, ceramic, plastic, composite or natural material may also be used for the extension 22. The extension 22 also includes an angled surface on an end opposite of the first boss 32. This angled surface generally will have a 45° angle, however any other angle may be used for this surface as long as it interacts with and mates with the angled surface of the base 20. The angled surface of the extension 22 also may include an orifice 36 therethrough. In the embodiment shown the orifice 36 will generally have a circular shape, however any other shaped orifice including but not limited to oval, square, triangular, octagonal, or any known random shape may also be used for the orifice 36. The extension 22 also may include a generally first and second circular or partially circular shoulder 38 extending from an inside surface thereof. The first and second circular shoulder 38 will be used to interact with the rotating connector 24 and secure the extension 22 to the rotating connector 24 at a predetermined position thereof.

The rotating connector 24 is arranged between the base 20 and extension 22 for the twisting end cap 10 according to the present invention. The rotating connector 24 may include a rotating base 40 secured within the base 20 of the end cap 10. A detent 42 may be arranged adjacent to and engaged with a surface of the rotating base 40. A bearing 44 may be engaged with a surface of the detent 42 on one end thereof and with a washer 46 on an opposite end thereof in one contemplated embodiment. It should also be noted that the washer 46 may be not be used in another contemplated embodiment. The rotating base 40 may have a generally circular surface 48 arranged at a predetermined angle on an end thereof that will be generally similar to that of the angled end of the base 20. This will allow for the angled circular surface 48 of the rotating base 40 to be arranged within the orifice 26 in the end of the base 20. It should be noted that the rotating base 40 also may include on its circular surface 48 at least one groove or notch therein that will interact with and hold at least one finger 50 extending from a surface of the detent 42. The finger 50 of the detent 42 may interact with the groove thus allowing for the detent 42 to rotate with respect to the rotating base circular surface 48 between a first or standard position and a second or rotated position. The fingers 50 of the detent 42 may have a predetermined spring coefficient that will allow for them to engage with the groove or notch on the circular surface 48 of the rotating base 40 and assist in locking and securing the end cap 10 in either its standard or first position and rotated or second position. The detent 42 may have at least one locking tab 52 extending from a surface thereof. This locking tab 52 will engage with a locking slot on a surface of the bearing 44. This will ensure that the detent 42 rotates with the bearing 42.

The bearing 42 generally will have a circular shape with a circumferential flange 54 extending from each end thereof. However, it should be noted that any other shape flanges may be used including flanges that are generally circular but have flat surfaces at predetermined positions. The bearing 42 may be arranged within the end of the extension 22 such that the first and second circumferential flange 54 extending from the bearing 44 will interact with the first and second circular shoulders 38 extending from an inside surface of the extension 22, thus securing the bearing 44 within the extension 22 such that the bearing 44 aligns with the orifice 36 through the angled end surface of the extension 22. The washer 46 may be arranged and engage a surface of the bearing 44 opposite that of the detent 42. In one embodiment contemplated the washer is made of or coated with Teflon, however any other plastic, metal, ceramic, composite or natural material may be used for the washer 46. All of the components of the rotating connector 24 including the washer 46, bearing 44, detent 42 and circular surface 48 of the rotating base 40 include an orifice 56 through or near a mid or center point thereof. The orifices 56 will allow for a fastener 58 to be arranged through the washer 46, bearing 44, detent 42, and circular surface 48 of the rotating base 40 and secure them to one another at a predetermined position with relation to each other. In one embodiment contemplated the fastener 58 will be a shoulder bolt 60 and nut 62 such that the nut 62 is arranged within a first and second surface of the rotating base 40 which will secure the nut 62 in one position thus allowing for the shoulder bolt 60 to be tightened to a predetermined torque without the use of a wrench to secure the nut during tightening of the shoulder bolt 60. However, it should be noted that any other bolt and nut combination or any other fastener can be used to connect the components of the rotating connector 24 to one another. Hence, the rotating base 40 is rotatably fixed with relation to the base 20 of the end cap 10. While the bearing 44 is rotatably fixed with relation to the extension 22 via the flat surfaces on one of the circular flanges 54 of the bearing 44 interacting with the inside walls adjacent to the generally circular shoulders or partially circular shoulders 38 extending from an inside surface of the extension 22. Hence, the bearing 44 and extension 22 will rotate as one unit while the base 20 and rotating base 40 will be rotatably fixed with respect to one another also. Thus, the bearing 44 may be secured within the extension 22 while the rotating base 40 may be secured within the base thus securing the base 20 to the extension 22 for the rotating or twisting end cap 10 according to the present invention.

In operation, the twisting end cap 10 will have relative rotation between the base 20 and extension 22 via the rotation allowed between the bearing 44 and rotating base 40. The end cap 10 in its standard or first position will have the axis of the base 20 and extension 22 generally parallel and aligned with one another thus creating the greatest length for the end cap 10 and hence shade assembly 12. If the user wants to reduce the effective length of the end cap 10, the user will rotate or twist the end cap extension 22 thus allowing for the bearing 44 to rotate with respect to the rotating base 40 and hence the extension 22 with respect to the base 20 until the axis of the extension 22 is in an orthogonal position with relation to the axis of the base 20. This will create a 90° rotation between the axes of the base 20 and extension 22. This will allow for the second boss 34 located on an outside surface of the extension 22 to engage with an interior portion of the automotive vehicle thus effectively reducing the length of the end cap 10 and overall shade assembly 12 allowing for the end cap 10 and shade assembly 12 to be used in a different portion within the vehicle or within an entirely different vehicle line. If the operator of the shade assembly 12 having the twisting end cap 10 wants to have the end cap 10 its first or standard position the operator will rotate or twist the extension 22 in either direction until the end cap extension 22 aligns with the base 20 in a linear manner such that the axis of the base 20 will align with the axis of the extension 22 thus effectively increasing the length for the end cap 10. It should be noted that if an end cap 10 is used on both ends of the shade assembly 12, this will allow for three effective lengths to be used for the shade assembly 12 thus increasing the effectiveness and lowering the manufacturing costs and design costs for the automotive manufacturer. It should be noted that the twisting end cap 10 can be rotated in either a clockwise or counterclockwise direction depending on the design requirements. It should further be noted that the detent 42 may engage with a notch or groove of the rotating base 40 in both the first or standard position and second or rotated position thus helping to secure the end cap 10 in both the first position and second position. The spring force of the detent 42 will be such that a predetermined amount of force will be needed to disengage the detent finger 50 from the groove or notch in the rotating base 40 such that accidental rotation of the twisting end cap extension 22 will not occur unless a predetermined force is applied thereto by the user of the shade assembly 12 within the automotive vehicle.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An end cap for use with a shade, said end cap comprising:
    a base;
    a rotating connector partially arranged within an end of said base; and
    an extension having said rotating connector partially arranged within an end of said extension, said extension is capable of rotating with respect to said base from a first position wherein an axis of said extension is parallel to an axis of said base to a second position wherein said axis of said extension is orthogonal to said axis of said base.

2. The end cap of claim 1 wherein said base having a slot therein.

3. The end cap of claim 1 wherein said base having an approximate 45° angle on one end thereof.

4. The end cap of claim 3 wherein said angled end having a generally circular orifice therein.

5. The end cap of claim 1 wherein said extension having an approximate 45° angle on one end thereof.

6. The end cap of claim 5 wherein said angled end having a generally circular orifice therein.

7. The end cap of claim 1 wherein said extension having a boss extending from an end thereof.

8. The end cap of claim 7 wherein said extension having a second boss extending from a surface thereof, said second boss partially supports the end cap when the end cap is in a second position, said boss partially supports the end cap when the end cap is in a standard position.

9. The end cap of claim 1 wherein said rotating connector having:
    a rotating base;
    a detent engaged with said rotating base;
    a bearing engaging said detent on one side thereof; and
    a fastener arranged through an orifice of said rotating base, said detent and said bearing.

10. The end cap of claim 9 wherein said detent having at least one finger extending from a surface thereof.

11. The end cap of claim 9 wherein said rotating connector having a washer engaged with said bearing on one side thereof and said fastener comprising a bolt and nut.

12. The end cap of claim 9 wherein said base having a shoulder extending from an inside surface thereof, and said rotating base is secured within said base and engages said shoulder.

13. The end cap of claim 12 wherein said bearing is secured within said extension.

14. The end cap of claim 12 wherein said rotating connector secures said base to said extension at an angled end of said base and said extension.

15. A shade assembly for use in a vehicle, said assembly comprising:
    a roller;
    a shade panel having one end attached to said roller; and
    an end cap mounted to at least one end of said roller and adapted to engage a portion of the vehicle to support said assembly therein, said end cap having:
    a base;
    a rotating base engaging and rotatably fixed with respect to said base;
    a detent engaging said rotating base;
    a bearing engaging said detent; and
    an extension engaging said bearing, said bearing rotatably fixed with respect to said extension.

16. The assembly of claim 15 wherein said end cap having a slot therein, and said detent having a locking tab extending from a surface thereof.

17. The assembly of claim 15 further comprising:
    a fastener arranged through orifices of said rotating base, said detent and said bearing.

18. The assembly of claim 17 wherein said rotating base having a washer engaged with said bearing.

19. The assembly of claim 17 wherein said rotating base is secured within said base.

20. The assembly of claim 19 wherein said bearing is secured within said extension, said extension is capable of rotating with respect to said base.

21. The assembly of claim 20 wherein said extension having a boss on an end thereof and a second boss extending from a surface thereof.

22. The assembly of claim 21 wherein said extension rotates or twists from a standard position to a second position, said boss engages the vehicle in said standard position and said second boss engages the vehicle in said second position.

23. A method of changing a length of an end cap for use with a shade assembly in a vehicle, said method including the steps of:
    rotating an extension from a predetermined position with respect to a base of the end cap to an orthogonal position with respect to said first position; and
    engaging one of two bosses arranged on said extension with a portion of said vehicle when the end cap is in a standard position and engaging said other of said bosses when the end cap is in a rotated or reduced length position.

* * * * *